United States Patent [19]
Dykstra et al.

[11] Patent Number: 4,756,572
[45] Date of Patent: Jul. 12, 1988

[54] BEVERAGE CONTAINER HOLDER FOR VEHICLES

[75] Inventors: Ronald A. Dykstra, Rockford; Carl W. Flowerday, Holland, both of Mich.

[73] Assignee: Prince Corporation, Holland, Mich.

[21] Appl. No.: 48,329

[22] Filed: May 11, 1987

Related U.S. Application Data

[62] Division of Ser. No. 725,831, Apr. 18, 1985.

[51] Int. Cl.[4] .............................................. A47C 7/62
[52] U.S. Cl. ..................................... 297/194; 297/145
[58] Field of Search ................ 108/136; 297/154, 155, 297/150, 194, 145; 312/312

[56] References Cited

U.S. PATENT DOCUMENTS

| | | |
|---|---|---|
| 330,201 | 11/1885 | Baynes . |
| 409,887 | 8/1889 | Walker . |
| 609,528 | 8/1898 | Wilson . |
| 994,797 | 6/1911 | Streit . |
| 1,869,444 | 8/1932 | Tobey ................................. 297/145 |
| 1,888,525 | 11/1932 | Callaway et al. ................ 297/145 X |
| 2,431,542 | 11/1947 | Caruso . |
| 2,528,056 | 10/1950 | Henry . |
| 2,628,054 | 2/1953 | Fazakerley . |
| 2,640,595 | 6/1953 | Byford . |
| 2,645,376 | 7/1953 | Gunther . |
| 2,649,270 | 8/1953 | Franks . |
| 2,704,114 | 3/1955 | Williams . |
| 2,778,702 | 1/1957 | Franks . |
| 2,845,113 | 7/1958 | Keel ..................................... 297/145 |
| 2,889,051 | 6/1959 | Kramer . |
| 2,903,311 | 9/1959 | Earhart . |
| 2,905,370 | 9/1959 | Pavol . |
| 3,039,616 | 6/1962 | Proffit . |
| 3,136,578 | 6/1964 | Tihovici . |
| 3,184,193 | 5/1965 | Melvin . |
| 3,326,445 | 6/1967 | Goings . |
| 3,494,503 | 2/1970 | Kingsley . |
| 3,497,076 | 2/1970 | O'Brien . |
| 3,583,760 | 6/1971 | McGregor ......................... 297/145 |
| 3,637,184 | 1/1972 | O'Brien . |
| 3,771,754 | 11/1973 | Swartz . |
| 3,784,142 | 8/1974 | O'Brien . |
| 3,800,973 | 4/1974 | Weaver . |
| 3,842,981 | 10/1974 | Lambert . |
| 3,866,990 | 2/1975 | McRae . |
| 3,893,569 | 7/1975 | Hoch . |
| 3,939,986 | 2/1976 | Pierro . |
| 4,040,659 | 8/1977 | Arnold . |
| 4,087,138 | 5/1978 | McRae . |
| 4,286,742 | 9/1981 | Pellegrino . |
| 4,303,109 | 12/1981 | Cohen . |
| 4,417,764 | 11/1983 | Marcus et al. . |

FOREIGN PATENT DOCUMENTS

| | | | |
|---|---|---|---|
| 620861 | 3/1949 | United Kingdom . | |
| 667894 | 3/1952 | United Kingdom ................ 297/145 |

*Primary Examiner*—Peter A. Aschenbrenner
*Attorney, Agent, or Firm*—Price, Heneveld, Cooper, DeWitt & Litton

[57] ABSTRACT

A beverage container holder for a vehicle includes a housing having a recess for receiving a container holder member for storage. The container holder member includes foldable members which unfold to define the holder member when the holder member is extended from the housing for use. In another embodiment, the beverage container holder includes a support having a well formed therein with a vertically movable platform located in the well. A control structure is provided which extends between the support and the platform for controlling the motion of the platform as a container is placed therein to provide a vertically adjustable support floor for the container placed in the well.

6 Claims, 6 Drawing Sheets

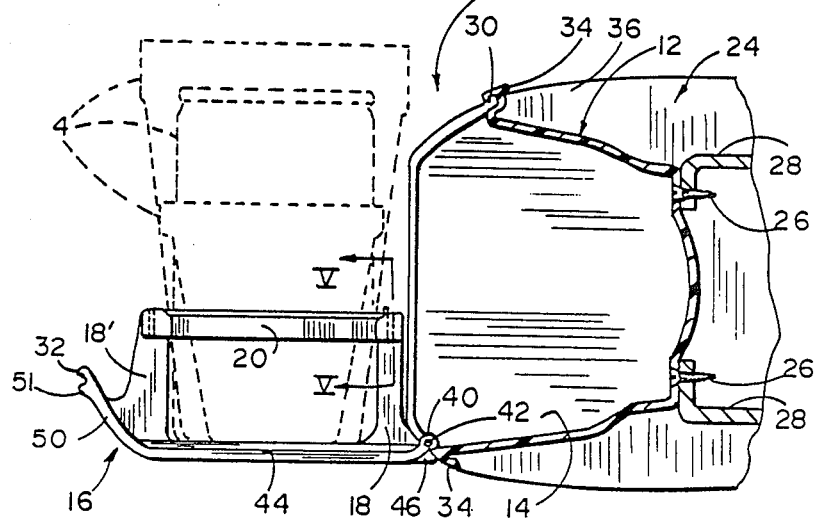
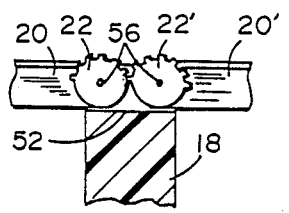
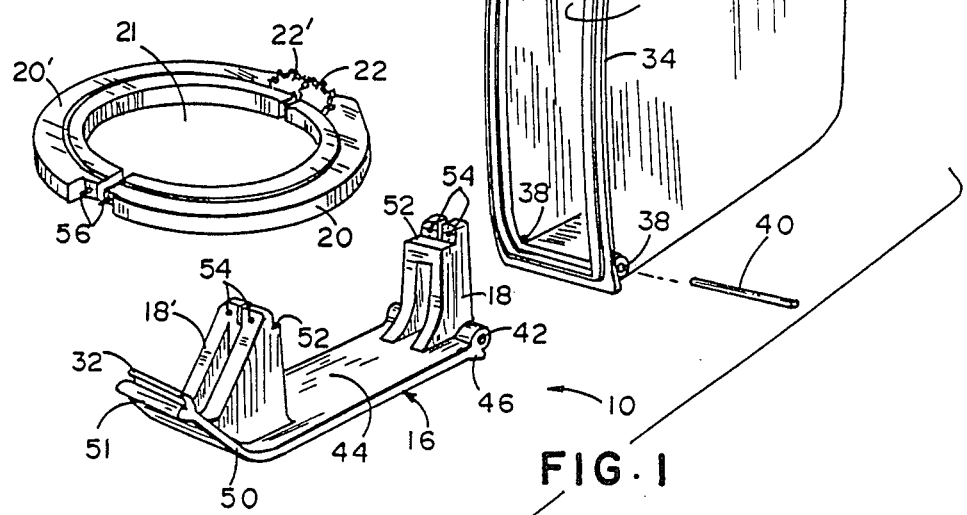

BEVERAGE CONTAINER HOLDER FOR VEHICLES

This is a division of application Ser. No. 725,831, filed Apr. 18, 1985.

BACKGROUND OF THE INVENTION

The present invention relates to beverage container holders, particularly for use in motor vehicles.

A beverage container holder offered as original equipment on automobiles typically either includes a deep cylindrical support recess located in the armrest or console into which a beverage container or cup can be placed or shallow cylindrical recesses formed in the back side of the glove compartment door. Both structures have drawbacks. The armrest or console holder gathers dirt and foreign matter which is difficult to remove, because the holder is deep, and its floor not readily accessible. The glove compartment door offers little support to the beverage container, so the container can easily be spilled if the automobile is moving and hits a bump. Also, when the door is open for use as a beverage holder, the contents of the glove compartment can be jarred and fall from the open compartment while the car is moving.

Alternatives to the two typical holders described include systems which are complicated or require too much room, particularly if they are to be incorporated into an armrest or console between the front seats of an automobile where other items, such as cassette tape storage compartments, parking brake levers, etc., may be located.

SUMMARY OF THE INVENTION

In the beverage container holder of the present invention, the accumulation of dust and dirt in the holder is greatly minimized because in one embodiment, the holder is retractable pivotally into a recess, while in another embodiment, the support floor in the recess can be raised to a position to be cleaned and where it covers the recess. In both embodiments, the holder supports the beverage container on its sides and bottom to restrain it from spillage while the vehicle is moving. In addition, both constructions are compact and can be easily assembled during manufacturing.

In one embodiment, the beverage container holder includes a housing having a recess, a container holder member having a container holder opening with foldable members which unfold to define the opening and a pivotal member on which the holder member is mounted. The pivotal member is movable into and out of the recess and pivotal from the first position for storage in the recess to a second position where the holder member can be unfolded to support a beverage container.

In an alternative embodiment of the invention, the beverage container holder includes a support having a well formed therein, a vertically movable platform located within the well and means extending between the support and the platform for controlling the motion of the platform as a container is placed therein to provide a vertically adjustable support floor for a container placed in the well.

BRIEF DESCRIPTION OF THE DRAWINGS

FIG. 1 is an exploded perspective view of a beverage container holder embodying the present invention;

FIG. 3 is a fragmentary cross-sectional view taken along section lines III—III of FIG. 2 illustrating the holder in an extended use position;

FIG. 5 is an enlarged, fragmentary cross-sectional view taken along section line V—V of FIG. 3;

DETAILED DESCRIPTION OF THE PREFERRED EMBODIMENT

Figure 2:
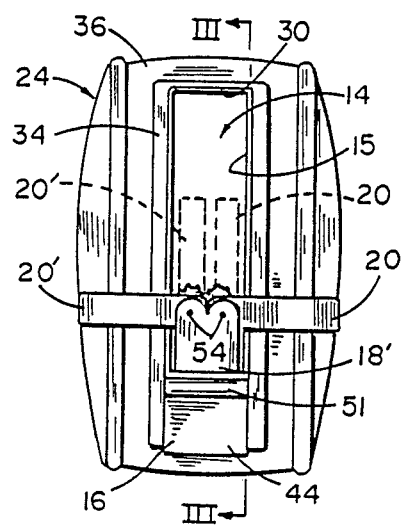
FIG. 2 is a front elevation of the beverage container holder shown in FIG. 1 and installed in an armrest.

The first embodiment of the beverage container holder 10 of the present invention is illustrated in FIGS. 1-6 and includes a first support, such as housing 12 illustrated with a front opening recess 14 therein. Housing 12 receives a second support 16 which is pivotally mounted to the lower front edge of housing 12. Support 16 includes a pair of vertically extending, horizontally spaced arms 18 and 18' which support a pair of semicircular members 20, 20' pivotally mounted between the upper ends of arms 18, 18'. One end of each of the two semicircular members includes gear means, such as gears 22 and 22', meshing with each other such that the pivotal movement of one of the semicircular members 20 or 20' will be transmitted to the other semicircular member. As shown in FIG. 2, semicircular members 20, 20' can be pivoted from a horizontally extended use position shown in solid lines where a beverage container opening 21 is formed to a folded vertical position shown in phantom lines whereupon the second support 16 can be pivoted into housing recess 14 to store and conceal the holder 10 from view.

Figure 4:
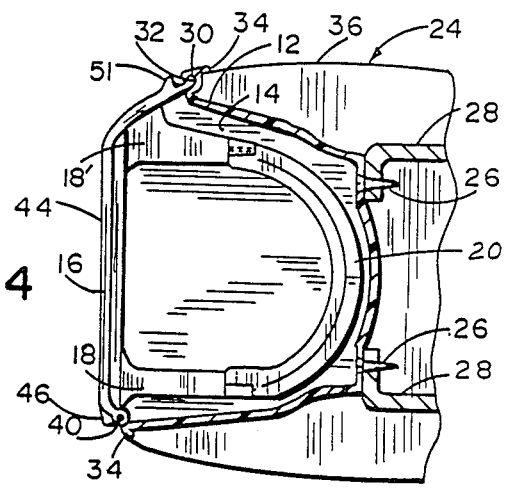
FIG. 4 is a fragmentary cross-sectional view taken along the same plane as FIG. 3 illustrating the beverage container holder in a retracted, stored position.
Figure 6:
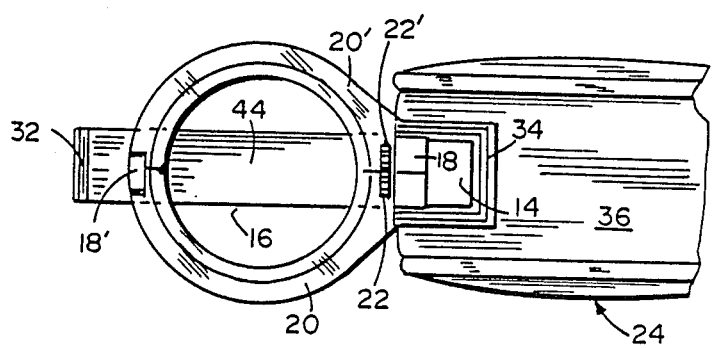
FIG. 6 is a fragmentary, top plan view of the beverage container holder of the present invention mounted in an armrest.

Support housing 12 can be generally rectangular and integrally molded of a suitable polymeric material, as illustrated in FIG. 1, or slightly tapered and installed in an armrest 24, as illustrated in FIGS. 3 and 4, by fastening with screws 26 to the framework 28 of the armrest. Armrest 24 typically is mounted between the seats in the front of an automobile or other vehicle. Housing 12 could, however, be mounted within a dashboard or other vehicle area convenient for use.

Housing 12 further includes recess 30 (FIG. 3) along its upper front edge for releasably receiving a catch 32 formed on the end of second support 16 when second support 16 is pivoted to the closed position illustrated in FIG. 4. A decorative flange 34 extends around the periphery of recess 14 and covers the edges of the upholstery 36 of armrest 24 around the opening 14 of housing 12. Housing 12 also includes a pair of spaced, apertured mounting means 38 (FIG. 1) on either side of the lower edge of the opening 15 into recess 14 for supporting a pin 40 extending through a lateral bore 42 along one edge of support 16 for pivotally mounting the support to the housing. Molded polymeric support 16 also integrally includes a floor or cover 44 extending between arms 18, 18' and which is shaped to cover opening 15 of recess 14 so the floor 44 is pivoted to retract the holder into recess 14.

Floor 44 has a stop 46 extending along its pivotally mounted edge which abuts against flange 34 along the lower edge of housing 12 when the cup holder is extended or lowered to receive a cup or other beverage container 48, as illustrated in FIG. 3. Stop 46 thus holds floor 44 in a substantially horizontal position and prevents it from pivoting downwardly below that position.

Floor 44 also includes a curved edge 50 which conforms to the exterior configuration of the opening 15 of recess 14, as shown in FIGS. 3 and 4. Catch 32 is integral with the end of edge 50 and is received within catch recess 30 along the upper edge of the opening into recess 14. The end of the edge 50 also includes a rounded projection 51 to provide a grip for manually disengaging catch 32 from the resilient polymeric catch recess 30 when the floor cover 44 is to be pivoted downwardly to the use position.

Arms 18 are spaced apart on and extend upwardly from floor 44 when it is in the horizontal position illustrated in FIGS. 1 and 3. Each arm 18, 18' is stepped at its top to form a ledge or step 52 on which the ends of semicircular members 20 rest when they are pivoted to a horizontal position illustrated in FIGS. 2, 3 and 5, preventing semicircular members from pivoting downwardly below a horizontal position. The portion of each arm 18 or 18' extending above ledge 52 has a pair of openings 54 for pivotally receiving pins 56 integral with ends of the resilient polymeric semicircular members 20, 20'. This allows the pivot mounting of the semicircular members to the support 16 for movement from the horizontal position illustrated in FIG. 2 to the vertical position illustrated in the same figure in phantom, such that the holder can be retracted into recess 14, as shown in FIG. 4.

As shown in FIG. 5, a gear 22, 22' is integrally molded to one end of each of the semicircular members 20, 20' and meshes with the other gear when the two semicircular members 20, 20' are mounted, as best illustrated in FIG. 5. Therefore, if one of the semicircular members 20, 20' is pivoted, its gear will engage the gear on the other semicircular member, forcing the other semicircular member to pivot as well. Thus, only one of the two semicircular members needs to be pivoted to control the pivotal movement of the other semicircular members 20 and 20'.

In use, as shown in FIG. 3, a cup, can, glass, bottle or other container 4 is placed on floor 44 for support along a rectangular segment centered across its bottom surface. The container is also held by the circumscribing discs 20, 20' spaced vertically above floor 44. The holder thus provides a stable base and sidewall support for the container. The basic container holder structure of the embodiment shown in FIGS. 1–7 is also incorporated in another embodiment of the invention shown in FIGS. 7–11 and now described.

Figure 7:
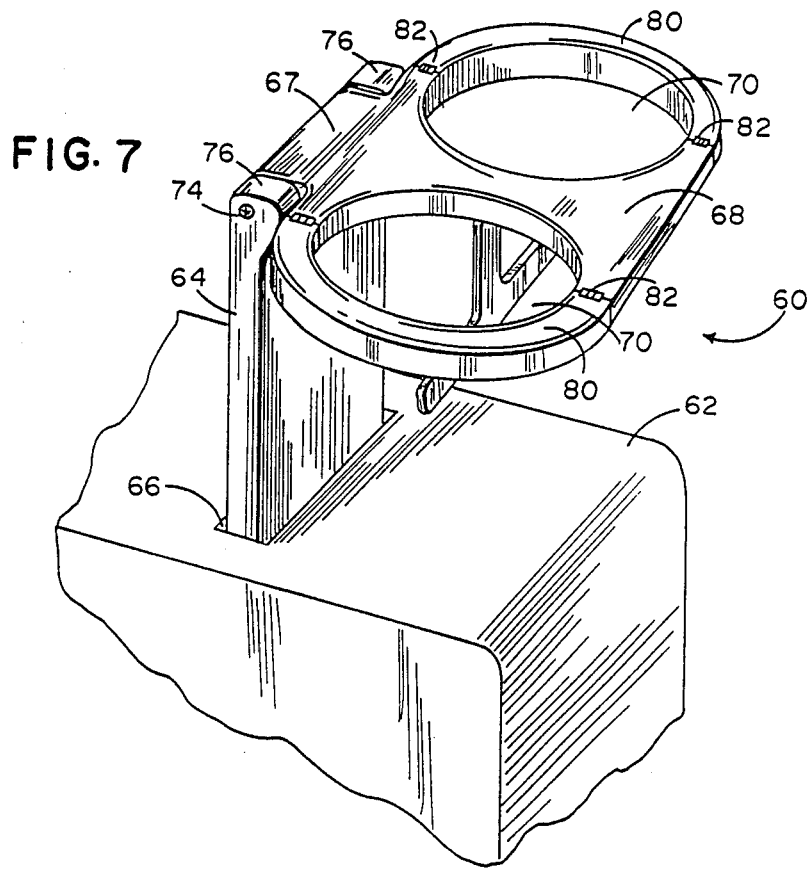
FIG. 7 is a fragmentary, perspective view of an alternative embodiment of a beverage container holder embodying the present invention and mounted in an armrest.
Figure 8:
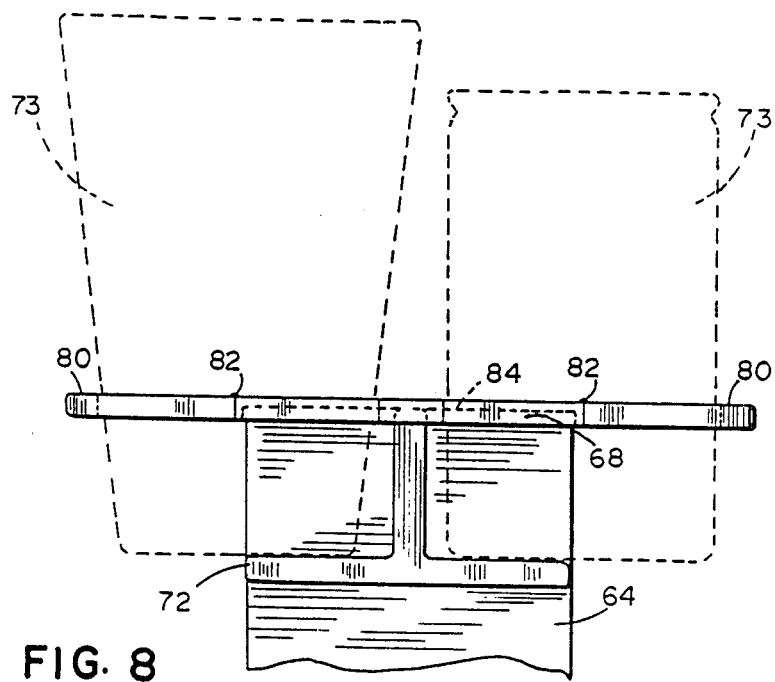
FIG. 8 is a fragmentary, front elevational view of the beverage container holder of FIG. 7.

The beverage container holder 60 (FIG. 7) includes a first support, such as an armrest 62, and a second support 64 slidably received within a vertically extending recess or slot 66 within armrest 62. Second support 64 has an articulated upper portion 68 which has means such as circular openings 70 for holding a beverage container on it. A pivotal T-shaped member is pivotally secured to the underside of articulated member 68 between openings 70 to provide support for the bottoms of beverage containers 73, as best seen in FIG. 8.

Member 68 is pivotally mounted to support 64 by pivot pins 74 which extend through arms 76 extending upwardly from the ends of support 64 receiving a central tab section 67 of the articulated upper segment 68 between them. Pins 74 extend into apertures in tab 67 to allow it to pivot about pins 74 between arms 76. Support 64 includes a ledge 78 (FIG. 10) extending between arms 76 to support articulated segment 68 horizontally and prevent it from pivoting downwardly beyond horizontal position illustrated in solid lines in FIG. 10.

Figure 9:
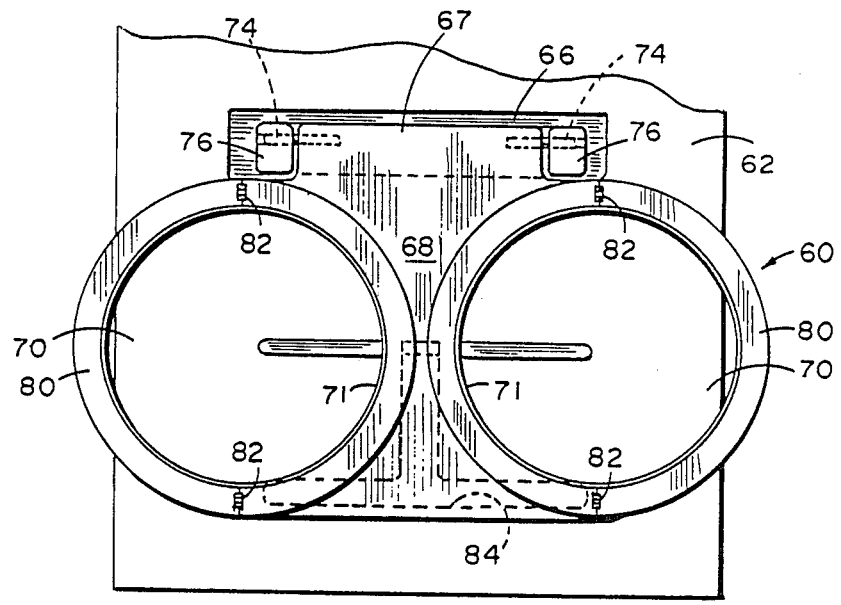
FIG. 9 is a top plan view of the beverage container holder of FIG. 7.
Figure 10:
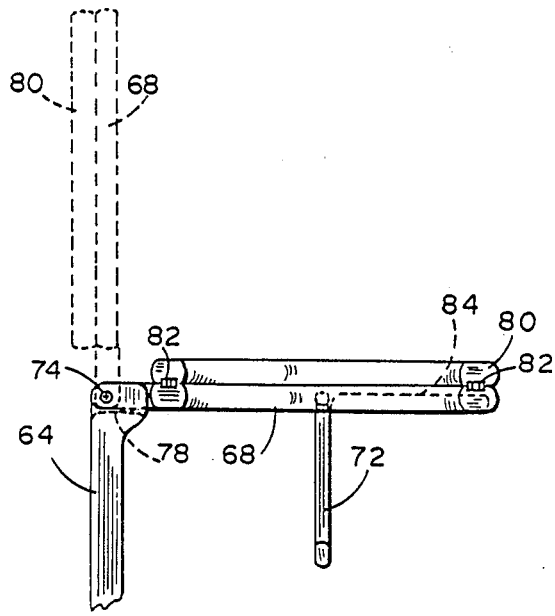
FIG. 10 is a fragmentary, detailed left side elevational view of the beverage container holder of FIG. 7.

Each opening 70 is partially formed by a pivotal semicircular member 80 which is hinged by hinges 82 (FIGS. 7 and 9) to upper articulated member 68. Each member cooperates with a semicircular recess 71 (FIGS. 1 and 9) formed in articulated member 68 to complete circular opening 70. To store holder 60 within recess 62, semi-circular members 80 are hinged to the position illustrated in FIG. 10 overlaying articulated upper portion 68, and then the articulated upper portion is pivoted to a vertical position illustrated in phantom in FIG. 10 directly above the rest of second support 64, and the assembly can be pushed downwardly into recess 62. The provision of pivotal semicircular members 80 allows the beverage container holder to have wider lateral dimensions than the width of slot 66, as shown in FIG. 9. When the assembly is to be retracted within recess 66, T-member 72 is pivoted upwardly into a T-shaped recess 84 (FIGS. 9 and 10) formed in the bottom of upper articulated portion 68. Therefore, the T-shaped member will not interfere with the insertion of the beverage container holder into recess 66 because it is folded out of the way.

Figure 11:
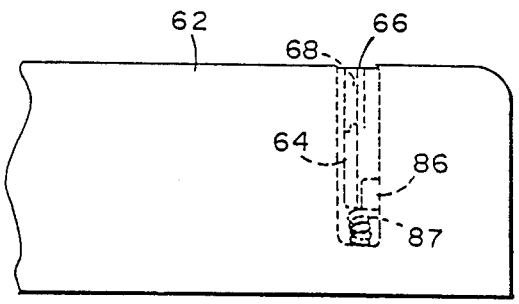
FIG. 11 is a left side elevational view of an armrest schematically illustrating the retraction of the beverage container holder illustrated in FIGS. 7-10 in the armrest.

As illustrated in FIG. 11, articulated second support 64 is releasably retained within recess 66 by a spring-loaded push lock, push unlock lock 86 mounted within armrest 62 and cooperating with member 64. Lock 86 can be of the type disclosed in U.S. Pat. No. 4,417,764, issued Nov. 29, 1983, entitled AUTOMOTIVE ARMREST ASSEMBLY, the disclosure of which is incorporated herein by reference. Thus, support 64 can be retracted from recess 66 merely by pushing down and allowing spring 87 (FIG. 11) associated with lock 86 and support 64 to push support 64 into an extended position, whereupon upper articulated portion 68 can be pivoted to a horizontal position and T-shaped member 72 and semicircular members 80 unfolded to support a beverage container, as illustrated in FIGS. 7 and 8. The individual elements of the holder can be molded of a suitable polymeric material, such as acrylonitrile-butadiene-styrene copolymer (ABS).

Figure 12:
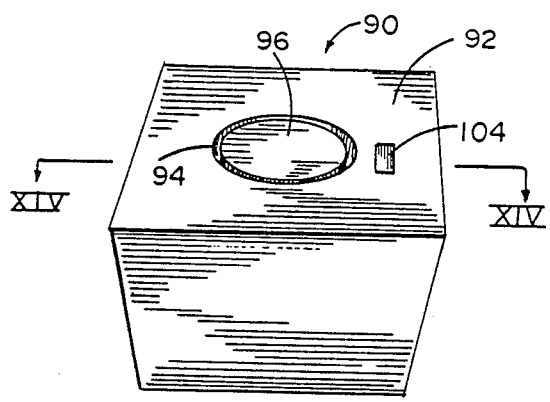
FIG. 12 is a perspective view of an alternative embodiment of the present invention.
Figure 13:
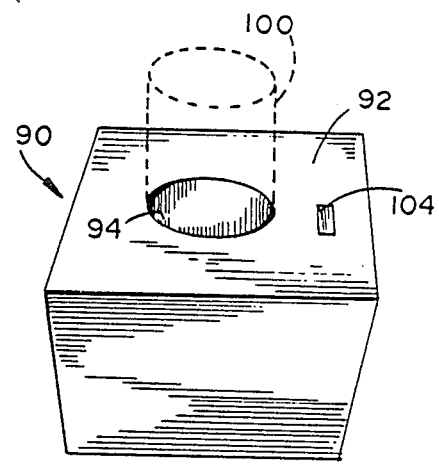
FIG. 13 is a perspective view of the third beverage container holder of the present invention supporting a beverage container illustrated in phantom.

A third embodiment of the cup holder of the present invention is illustrated in FIGS. 12-15. Beverage container holder 90 includes a support 92, such as an armrest or the like, with a downwardly extending, cylindrical well 94 formed therein. A vertically movable circular platform 96 is located within the well and is movable by vertical positioning means, such as a toothed rack 98 and pawl 99 to selected vertical positions within well 94 to provide a vertically movable support floor for a beverage container 100 when positioned within the well. However, when platform 96 is not used as a beverage container support floor, it can be raised to a position substantially flush with the top of armrest 92, as seen in FIG. 12, where it conceals well 94.

Figure 15:
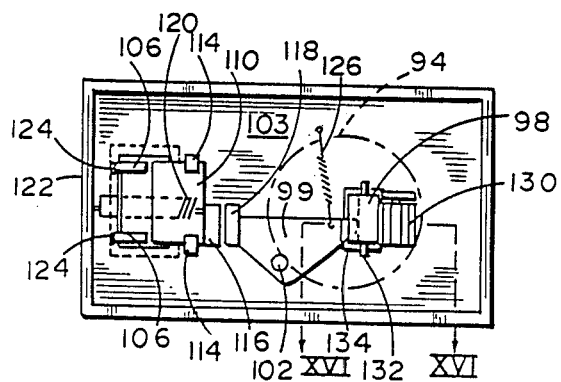
FIG. 15 is a bottom plan view of the beverage container holder illustrated in FIG. 14.
Figure 14:
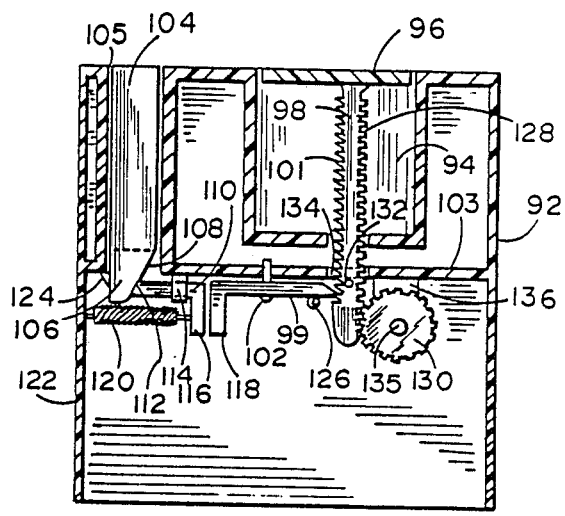
FIG. 14 is a cross-sectional view taken along the plane of line XIV—XIV of FIG. 12.

As shown in FIGS. 14 and 15, the vertical control means includes a toothed rack 98 with pawl teeth 101 on one side, the teeth being selectively engageable by a pawl 99 in the form of a horizontally movable bell crank pivotably mounted by a pin or screw 102 to a horizontal wall 103 which extends across the inside of support 92. Pawl 99 can be selectively engaged or disengaged from rack 98, thereby holding platform 96 in selected lowered vertical positions within well 94 against the upward spring force provided to floor 96 through gear 130, as described below.

Pawl 99 is actuated by push button 104 which extends to the top of support 92 through aperture 105. The lower end of actuator button 104 includes a pair of spaced arms 106 (FIG. 15) which have angled cammed edges 108 (FIG. 14) which engage an angled surface 112 of cam follower 110. Cam follower 110 is slidably mounted on the underside of wall 103 by two L-shaped guide members 114 (FIGS. 14 and 15) which allow cam follower 110 to slide toward and away from bell crank arm 118. Thus, as actuator button 104 is depressed downwardly, follower member 110 engages arm 118 and pawl 99 pivots about screw 102 and disengages from teeth 101 on rack 98. This allows rack 98 and platform 96 to move upwardly. Pawl 99 automatically reengages with rack 98 when actuator button 104 is released to hold the platform in a selected lowered position. A tension spring 120 connected between arm 116 of cam follower 110 and the sidewall 122 of armrest 92 urges cam follower 110 away from bell crank 99 when actuator button 104 is released and urges actuator button 104 upwardly. Stop 124 on actuator arm 106 engages the bottom of wall 103 when actuator button 104 reaches its raised position, preventing actuator button 104 from being forced above the top surface of armrest 92. A tension spring 126 is hooked in apertures in the pawl end of bell crank 99 and the bottom surface of wall 103 for urging pawl 99 into engagement with teeth 101 when actuator button 104 is released.

Figure 16:
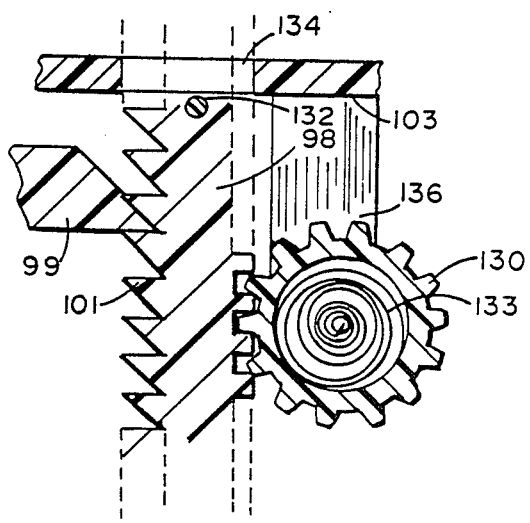
FIG. 16 is a cross-sectional view taken along section line XVI—XVI of FIG. 15.

Rack 98 also has a plurality of gear teeth 128 on an edge opposite rachet teeth 101 which engage a gear 130 rotatably mounted by axle 135 extending from support 136 extending downwardly from wall 103. A spirally wound internal main spring 133 (FIG. 16) extends between gear 130 and fixed axle 134 and winds into compression as rack 98 is urged downwardly within well 94 and forces gear 130 to turn counter-clockwise when viewed from the position shown in FIG. 14. When pawl 99 is released from engagement with teeth 101, spring 133 within gear 130 will unwind, causing gear 130 to rotate clockwise, raising rack 98 and platform 96 to a raised position. A rod 132 extends through rack 98 near its lower end and prevents rack 98 from raising above the top surface of armrest 92 since rod 132 is longer than the lateral dimensions of the opening 134 in wall 103 through which rack 98 extends.

Each tooth 101 on rack 98 is angled downwardly, as is the tip of pawl 99 which engages teeth 101. This allows platform 96 to be pushed downwardly in a racheting manner without having to depress actuator button 104. Thus, the vehicle operator does not need two hands to operate the device, because platform 96 can be depressed simply by placing a beverage container on it and pushing the container downwardly into well 94. When the desired position is reached, the horizontal position of the tooth 101 engaged by pawl 99 will hold platform 96 against upward movement by spring 133 and gear 130 until actuator button 104 is depressed.

While three embodiments of the present invention have been shown and described, modifications will become apparent to those of ordinary skill in the art and will fall within the scope and spirit of the invention as defined by the appended claims.

The embodiments of the invention in which an exclusive property or privilege is claimed are defined as follows:

1. A beverage container holder for a vehicle, comprising:
   a first support having a vertically oriented recess therein;
   a second support slidably received within said recess and movable from a first position within said recess to a second position extended from said recess, said second support including an articulated end portion which can be moved to a substantially horizontal position when said second support is in said second position; and
   foldable means on said end portion of said second support which pivots from a folded position for storage to an open position defining in part at least one circular opening for holding a beverage container.

2. The beverage container holder as defined in claim 1 further including a pivotal member secured to and extending below said articulated end portion when it is in said horizontal position such that a beverage container can be placed in said opening and supported by said pivotal member.

3. The beverage container holder as defined in claim 2 wherein said foldable means further defines a second opening in said end portion spaced from said first named opening.

4. The beveragae container holder as defined in claim 3 wherein said foldable means comprises a foldable member pivotally secured at each side of said end portion for forming at least part of each of said openings.

5. The beverage container holder as defined in claim 4 wherein each of said foldable members is arcuate shaped and can be folded overlaying said articulated end portion for storage in said recess and are extended from said articulated end portion to form said openings when said articulated end portion is in said horizontal position.

6. The beverage container holder as defined in claim 1 wherein said second support includes a ledge upon which said articulated end portion rests when pivoted to said horizontal position.

* * * * *

UNITED STATES PATENT AND TRADEMARK OFFICE
CERTIFICATE OF CORRECTION

PATENT NO. : 4,756,572

DATED : July 12, 1988

INVENTOR(S) : Ronald A. Dykstra and Carl W. Flowerday

It is certified that error appears in the above-identified patent and that said Letters Patent is hereby corrected as shown below:

Column 3, line 65:
"members 20 and 20'." should be --member and the gears control the vertical position of the semicircular members 20 and 20'.--

Signed and Sealed this

Twenty-ninth Day of November, 1988

Attest:

DONALD J. QUIGG

Attesting Officer

Commissioner of Patents and Trademarks